UNITED STATES PATENT OFFICE.

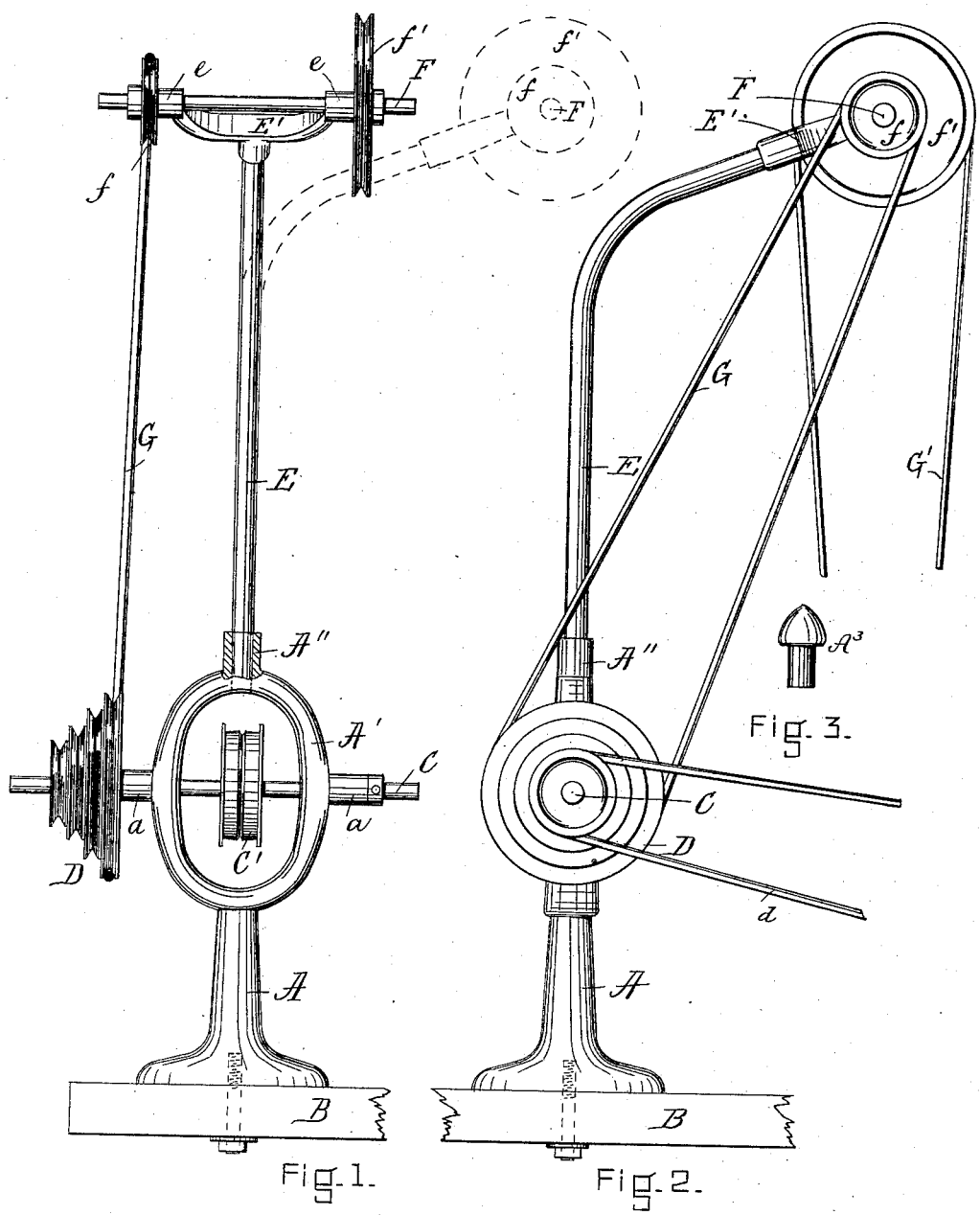

EDWARD RIVETT, OF BOSTON, MASSACHUSETTS.

COUNTER-SHAFT BRACKET FOR WATCH-MAKERS' LATHES.

SPECIFICATION forming part of Letters Patent No. 375,770, dated January 3, 1888.

Application filed March 23, 1887. Serial No. 232,085. (No model.)

*To all whom it may concern:*

Be it known that I, EDWARD RIVETT, a citizen of the United States, and a resident of Boston, in the county of Suffolk and State of Massachusetts, have invented new and useful Improvements in Counter-Shafts for Watch-Makers' Lathes, of which the following, taken in connection with the accompanying drawings, is a specification.

This invention relates to improvements in counter-shafts for watch-makers' lathes and similar tools, and it is carried out as follows, reference being had to the accompanying drawings, wherein—

Figure 1 represents a front elevation of the invention, and Fig. 2 represents a side view of it. Fig. 3 represents a cap or plug adapted to be inserted in the socket of the lower part of the structure when its upper part is removed, as will be hereinafter more fully shown and described.

Similar letters refer to similar parts wherever they occur on the different parts of the drawings.

A in the drawings is the post or standard, adapted to be secured to the table B by means of a screw-bolt and nut or thumb-screw, as usual. The post A has in its upper end a ring-shaped frame, A', with side bearings, $a\ a$, for the main counter-shaft C, to which is secured within the ring-shaped frame A' the pulley C', to which a rotary motion is conveyed by means of a belt from a corresponding rotary pulley below the table B, such latter pulley being, however, not shown in the drawings, as it forms no part of my present invention.

Outside of the ring-shaped frame A' is secured to the main counter-shaft C the cone-pulley D, having a series of circumferential grooves of increasing size, as is usual in counter-shafts of this kind, and by means of said cone-pulley and a strap, $d$, leading from it to the pulley on the lathe-spindle, the latter is set in a rotary motion, as usual. The ring-shaped frame A' projects above the pulley C', as shown in Figs. 1 and 2, by which great strength is obtained, preventing the bearings $a\ a$ from getting out of a linear position relative to the main counter-shaft C, particularly so while said bearings are being bored out and during the operation of finishing the post and frame A A' and its bearings $a\ a$. Said ring-shaped frame A' also serves as a guard above the pulley C', preventing the operator's hands or clothing from getting accidentally caught, as well as protecting said pulley from injury if heavy objects should accidentally drop on said ring-shaped frame A'.

On the frame A' or any other stationary part of the structure I make a socket, A'', (shown in Figs. 1 and 2,) adapted to receive the lower end of the bent rod or pipe E, as shown, said rod being curved to one side between its upper and lower ends, and has attached to its upper end the forked bearing-piece E', having bearings $e\ e$ for the secondary counter-shaft F, as shown in Figs. 1 and 2. Outside of the bearings $e\ e$ are secured to the counter-shaft F the respective cord or belt pulleys $f$ and $f'$, as shown in said Figs. 1 and 2.

By means of a cord or belt, G, leading from the grooved cone-pulley D to the pulley $f$, a rotary motion is imparted to the counter-shaft F, and by means of the cord or belt G', leading from the large pulley $f'$ on shaft F to a pulley on that part of the lathe that is to be rotated—such as, for instance, a drill, grinder, polisher, &c.—a quick rotary motion is imparted to the latter. The curved rod or pipe E is preferably made slightly yielding or elastic, so as to obtain a proper tension on the cords or belts G and G' by the springy nature of such rod or pipe. By this arrangement of the curved or bent rod E, its counter-shaft F, and pulleys attached to it, as described, I am able to convey a very quick rotary motion to the desired tool in the tail-stock or other portion of the watch-maker's lathe or other machine, as may be desired, and such motion is made nearly positive on account of the long cords or belts G G' that I am enabled to use by having the secondary counter-shaft F located overhead, and being so arranged the desired quick rotary motion is conveyed to the desired tool without interfering with the proper execution of the work to be done.

When not needed for use, the bent or curved rod E and its upper counter-shaft, F, and pulleys $f\ f'$ can be swung to one side, as shown in dotted lines in Fig. 1, and previous to swinging it out of the way, as described, the cords G G' are to be detached from their respective pulleys. During such operation of swinging the counter-shaft F and its pulleys to one side the lower end of the rod E is turned within the socket A''; or, if so desired, the said rod E may be detached from such socket and the plug A³ (shown in Fig. 3) inserted in socket A'', if so desired, to improve the appearance of the device.

Having thus fully described the nature, construction, and operation of my invention, I wish to secure by Letters Patent and claim—

The standard A and its ring-shaped bearing A', having shaft C journaled therein, and having pulley C' within the ring-shaped bearing A', and cone-pulley D outside of the same, both secured to said shaft C, and the socket A'' in the upper end of the ring shaped bearing A', in combination with the detachable bent rod or pipe E, having the bearing-piece and bearings E' e e secured to its upper end, the shaft F, journaled in said bearings and provided with the pulley f, belted to the cone-pulley D by means of cord or belt G, and having the pulley f', for conveying a rotary motion to the lathe or other tool, substantially as and for the purpose set forth.

In testimony whereof I have signed my name to this specification, in the presence of two subscribing witnesses, on this 19th day of March, A. D. 1887.

EDWARD RIVETT.

Witnesses:
ALBAN ANDRÉN,
HENRY CHADBOURN.